United States Patent [19]

Wüllenweber

[11] 4,451,347

[45] May 29, 1984

[54] FILTER-PRESS TYPE ELECTROLYZER FOR WATER

[75] Inventor: Heinz Wüllenweber, Frankfurt am Main, Fed. Rep. of Germany

[73] Assignee: Metallgesellschaft Aktiengesellschaft, Frankfurt am Main, Fed. Rep. of Germany

[21] Appl. No.: 338,533

[22] Filed: Jan. 11, 1982

[30] Foreign Application Priority Data

Jan. 15, 1981 [DE] Fed. Rep. of Germany ....... 3101120

[51] Int. Cl.³ .......................... C25B 9/00; C25B 1/10; C25B 1/12; C25B 1/08
[52] U.S. Cl. .................................. 204/258; 204/266; 204/279; 204/129
[58] Field of Search ................................ 204/253–258, 204/279, 267–270, 129

[56] References Cited

U.S. PATENT DOCUMENTS 2,717,872 9/1955 Zdansky .......................... 204/258 X
4,076,609 2/1978 Mas ..................................... 204/258

FOREIGN PATENT DOCUMENTS 578896 7/1959 Canada ............................... 204/253
2410059 7/1979 France ................................ 204/257
2027613 2/1980 United Kingdom ................ 204/253

Primary Examiner—Donald R. Valentine
Attorney, Agent, or Firm—Karl F. Ross; Herbert Dubno

[57] ABSTRACT

This invention relates to a filter press type electrolyzer for water comprising pressure-resistant decomposing cells, each of which contains an electrolyte chamber, which is divided by a diaphragm into two electrode compartments. The decomposing cells are enclosed on the outside by cell frames, which are electrically insulated from each other by an interposed sealing ring. On the sides, each cell is separated from the adjacent cells by metallic cell-separating partitions. At least three ducts extend through the cells and respectively serve to supply electrolyte and to discharge hydrogen and oxygen. Each duct is composed of sections. The sections of the ducts consist of sleeves, which are resistant to the operating conditions and insulated from each other and extend through openings in the cell-separating partitions. These openings are lined with metal rings. In accordance with the invention, the metal rings are secured to the cell-separating partitions by a gas- and liquid-tight welded joint and the sleeves are slidably fitted in the metal rings.

4 Claims, 1 Drawing Figure

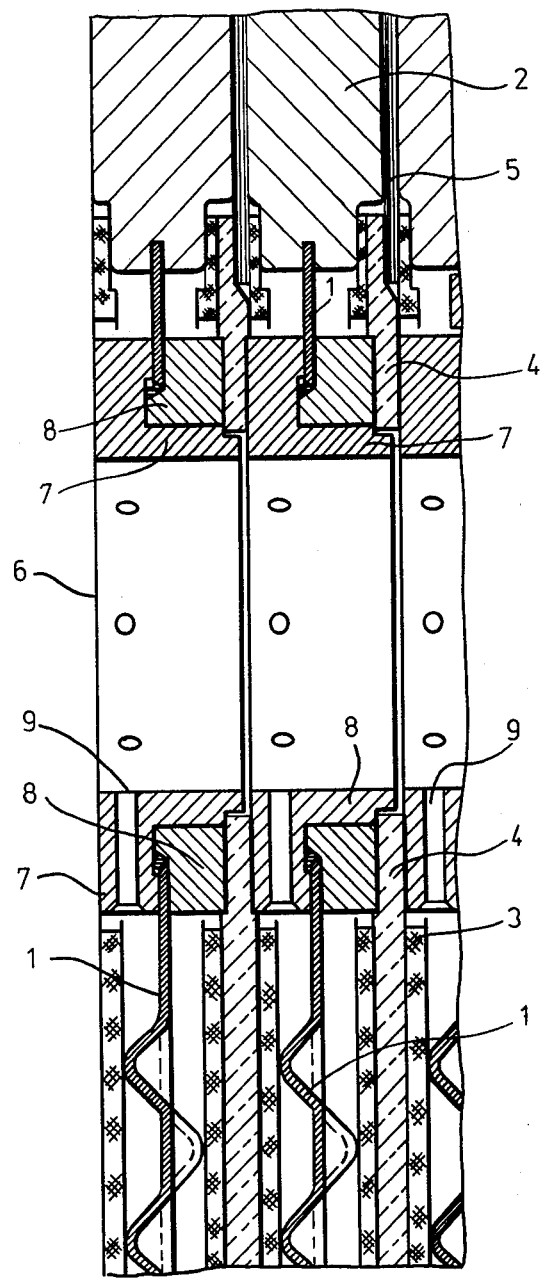

FILTER-PRESS TYPE ELECTROLYZER FOR WATER

FIELD OF THE INVENTION

My present invention relates to water electrolyzers and, more particularly, to a filter-press-type water electrolyzer and especially to a duct and cell assembly therefor.

BACKGROUND OF THE INVENTION

Filter-press-type electrolyzers can comprise, as described at page 1156 ff of *The Encyclopedia of Electrochemistry*, Reinhold Publishing Corp., New York, 1964, a number of pressure-resistant decomposing cells, each of which includes a diaphragm, e.g. of asbestos.

Each of the electrolyte chambers, divided by the diaphragm into two electrode compartments, is enclosed on the outside by two cell frames, whose sections are electrically insulated from each other by an interposed sealing ring.

The cells are separated on the sides from the adjacent cells by metallic cell-separating partitions. At least three ducts, each of which is composed of sections and which respectively serve to supply electrolyte and to discharge hydrogen and oxygen extend through the cells.

The sections of the ducts consist of sleeves, which are resistant to the operating conditions and insulated from each other and extend through the cell-separating partitions in openings lined with metal rings.

Filter-press-type electrolyzers for water under pressure can have a large number of electrolytic cells, which are assembled in a row and held together by tie rods. Each cell is defined by two cell-separating partitions, which are usually goffered and nickel-plated throughout their surface.

Nickel-plated steel wire mesh forms the electrodes which are mounted on the cell-separating partitions.

The diaphragm consisting usually of asbestos separates each cell into an anode compartment and a cathode compartment.

For the separate discharge of the hydrogen and oxygen which have been produced, two ducts are provided, which extend throughout the length of the set of cells. One duct communicates with the cathode compartments and the other with the anode compartments of all cells. During the operation of the pressure water electrolyzer, the gases which have been produced and electrolyte enter the gas ducts. Electrolyte is separated from the gas in separators. Distilled water is added to the electrolyte to make up for the hydrogen and oxygen which have been produced and is then returned to the cells in electrolyte ducts.

It is known that the gas ducts extending directly through the cell chambers may be assembled from several duct sections. For instance, the sleeves connected to each other may consist at least in part of fluorine-containing plastic material (Swiss Pat. No. 334,612).

The sleeves are secured to the bipolar cell-separating partitions and connected to form a continuous gas duct. The diaphragm is also used as a sealing ring between adjacent sleeves. Suitably arranged transverse bores provide for the communications from the cathode compartment to the hydrogen duct and from the anode compartment to the oxygen duct.

A problem stated in the above-mentioned patent is to minimize shunt currents. Another problem, which is at least as important, is to prevent oxyhydrogen formation, i.e. an ingress of hydrogen from the cathode compartment into the oxygen duct and an ingress of oxygen from the anode compartment into the hydrogen duct. This is desirable accomplished by the provision of duct sections which enclose the openings of the cell-separating partitions and consist each of a flange member and of a ring screwed on the flange member.

The duct section for enclosing and sealing a gas duct opening in a cell-separating partition of a filter-press-type electrolyzer for water under pressure may consist of a flange member, which has transverse bores and is formed with a neck portion, and of a thrust ring, which has a recess for receiving a sealing consisting of a sealing composition that is permanently resilient and resistant to the electrolyte and impermeable at least to gas (German patent document No. 27 03 247).

It has been found that even when the parts of which the duct section is composed are very closely fitted, which requires close manufacturing tolerances and a substantial expenditure for inspection, screwed or plug joints will not afford the tight seal desired, particularly after long periods of operation, so that hydrogen can diffuse to the oxygen side and oxygen can diffuse to the hydrogen side through the duct sections. Particularly the oxygen which has diffused to the hydrogen side reacts exothermically immediately to form water. That combustion results in a considerable local temperature rise and strong corrosive action.

OBJECT OF THE INVENTION

It is an object of the invention to provide a water electrolyzer which is free from the disadvantages of the known apparatus and is so designed that particularly a diffusion of gas into other gas spaces will be reliably avoided.

SUMMARY OF THE INVENTION

This object is attained in a water electrolyzer of the kind described wherein the metal rings are secured to the cell-separating partitions by a gas-and liquid-tight welded joint and the sleeves are slidably fitted in the metal rings.

Surprisingly a similar construction apparatus has not been conceived heretofore although water electrolyzers have been in operation for about 25 years and the disadvantages discussed have been recognized for about the same time and require the parts which have been damaged by corrosion to be repaired or renewed from time to time.

The metal ring secured by a welded joint prevents a diffusion of gas into the adjacent electrode compartment so that the disadvantages described above cannot occur. The welded joint will not prevent a flow of gas into the gas duct through the interface between the sleeve and the cell-separating partition. But at that interface the gas can enter only that gas duct to which the same gas is supplied through the transverse bores of the sleeve.

In accordance with a preferred further feature of the invention, each of the metal rings of the water electrolyzer has a neck, which extends into the oversized opening in the cell-separating partition and which has a length that is approximately as large as the thickness of the cell-separating partition.

This design is desirable particularly from the manufacturing aspect because the metal ring is centered in the cell-separating partition so that the gas- and liquid-tight welded joint can be made in a particularly simple manner.

The sleeves of which the duct is composed may be made of various materials, provided that they are insulated from each other and withstand the operating conditions. For instance, metal sleeves may be used, which are provided with insulation at least at one end. Alternatively, the sleeves may comprise a metal core, which is provided throughout its surface with a resistant, insulating coating.

It will be particularly desirable to make the sleeves from suitable plastic (synthetic-resin) material, particularly of polytetrafluoroethylene.

The sleeves can have a cylindrical portion, a neck for guiding the diaphragm, and a shoulder for engaging the cell-separating partition.

The other components of the water electrolyzer are known per se. For instance, the cell-separating partitions are suitably made from metal wire mesh. The pieces of metal wire mesh are backed by the projections of the goffered plate and are urged against the diaphragm, which preferably consists of asbestos. The goffered plate as well as metal wire mesh usually consists of nickel-plated steel.

BRIEF DESCRIPTION OF THE DRAWING

The above and other objects, features and advantages of the present invention will become more readily apparent from the following description, reference being made to the accompanying drawing, the sole FIGURE of which is a sectional view showing the duct and cell structure of the invention in a section through one of the gas ducts, the section being taken so that two complete cells are visible.

SPECIFIC DESCRIPTION

The electrolyzer operates as previously described and, according to the present invention, is provided with the cell and duct structure described in connection with the drawing.

Each of the cells shown in the drawing is defined by two cell-separating partitions 1, two pieces of electrode-forming metal wire mesh 3 disposed in the cell adjacent to respective partitions 1, and a diaphragm 4 disposed between the pieces of metal wire mesh 3. A sealing ring 5 is disposed between two cell frames 2. One of the two gas ducts of the water electrolyzer is designated 6. The sleeve 7 which constitutes a section of the duct is fitted into the metal ring 8 and is held in position at one end by the diaphragm 4 and at the other end by the metal ring 8. The sleeve 7 has a bore 9, through which the electrode compartment communicates with the gas duct 6. A weld joint can be seen between each ring 8 and the associated partition 1.

I claim:

1. In a filter-press-type electrolyzer for water comprising pressure-resisting decomposing cells, each of which comprises an electrolyte chamber divided by a diaphragm into two electrode compartments and enclosed on the outside by two cell frames whose sections are electrically insulated from each other by an interposed sealing ring, and which is separated on the sides from the adjacent cells by metallic cell-separating partitions, at least three ducts, each of which is composed of sections and which respectively serve to supply electrolyte and to discharge hydrogen and oxygen extend through the cells being provided, the sections of the ducts consisting of sleeves which are resistant with respect to the operating conditions and insulated from each other and extend through the cell-separating partitions in openings framed with metal rings, the improvement wherein a metal ring is secured to each of the cell-separating partitions by a gas- and liquid-tight welded joint and the sleeves are slidably fitted in the metal rings.

2. The improvement defined in claim 1 wherein each metal ring has a neck which extends into the opening in the cell-separating partition and which has a length that is approximately as large as the thickness of the cell-separating partition.

3. The improvement defined in claim 1 or claim 2 wherein each sleeve consists of plastic material.

4. The improvement defined in claim 3 wherein each sleeve consists of polytetrafluoroethylene.

* * * * *